T. TISSIER.
DOWEL.
APPLICATION FILED NOV. 27, 1908.
1,073,182.
Patented Sept. 16, 1913.
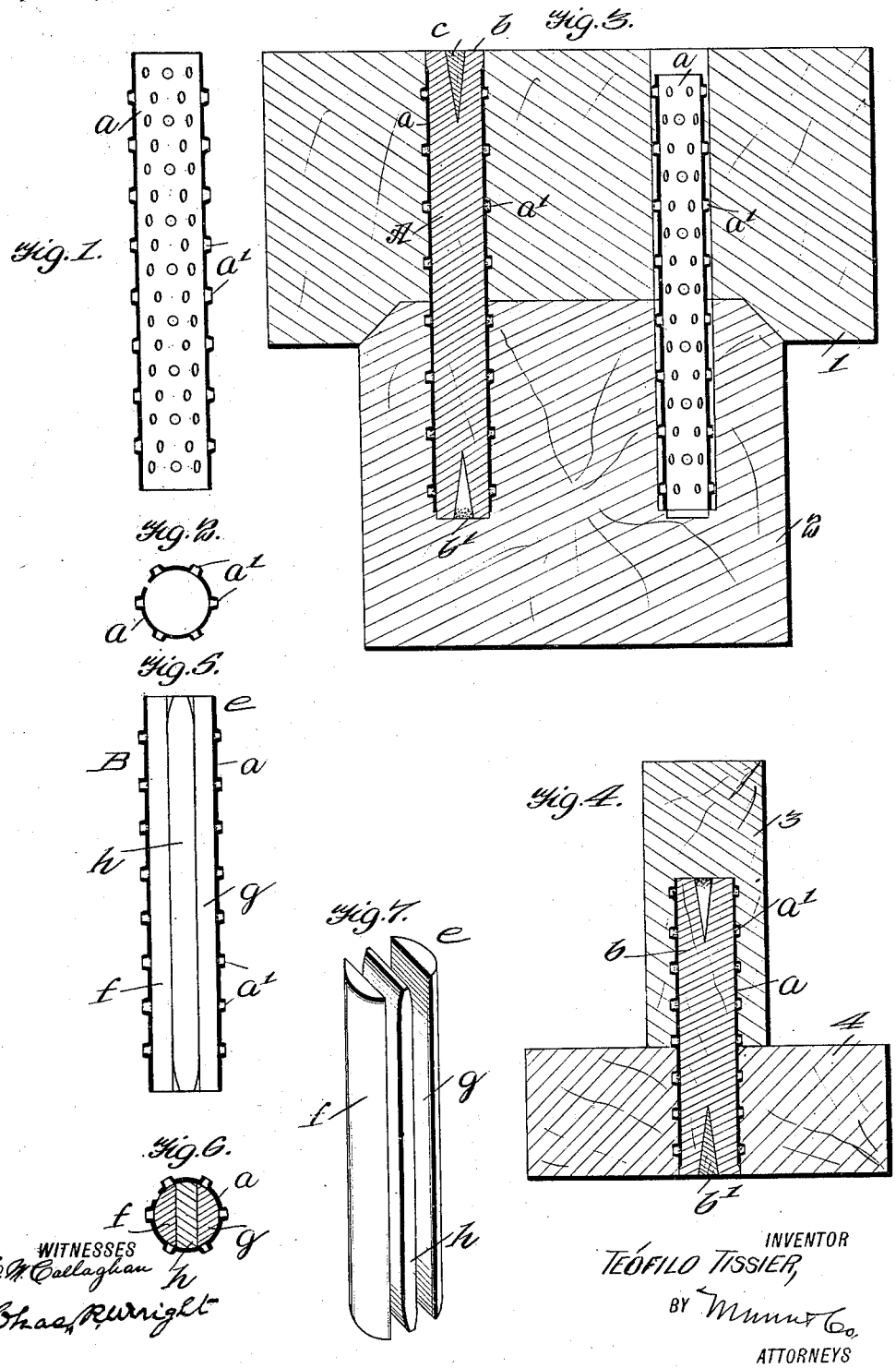
WITNESSES
E. W. Callaghan
Chas. R. Wright
INVENTOR
TEÓFILO TISSIER,
BY Munn & Co.
ATTORNEYS

UNITED STATES PATENT OFFICE.

TEÓFILO TISSIER, OF BUENOS AIRES, ARGENTINA.

DOWEL.

1,073,182. Specification of Letters Patent. Patented Sept. 16, 1913.

Application filed November 27, 1908. Serial No. 464,806.

*To all whom it may concern:*

Be it known that I, TEÓFILO TISSIER, of Buenos Aires, Argentina, have invented a new and Improved Dowel, of which the following is a full, clear, and exact description.

My invention relates to dowels for cabinet work and for all other purposes where two wooden portions are to be secured together, and has for its object to provide a dowel by means of which the usual and well known mortise and tenon joint may be dispensed with.

A further object of the invention is to provide a dowel which is simple and inexpensive.

A practical embodiment of the invention is shown in the accompanying drawing forming a part of this specification in which similar characters of reference indicate corresponding parts in all the views.

Figure 1 is a longitudinal sectional view of the expansible sleeve-portion of the dowel. Fig. 2 is a transverse section of the same. Fig. 3 is a sectional view showing the improvement applied and partly applied. Fig. 4 is a sectional view showing the application of the improvement to pieces which are comparatively small. Fig. 5 is a side view, the sleeve being in section, of a modification. Fig. 6 is a transverse section of the same; and Fig. 7 is an elevation of the dowel body shown in Figs. 5 and 6, the parts being separated.

Referring to Figs. 1, 2 and 3 of the drawing, A is the dowel formed of the metallic expansible sleeve $a$ and wooden body portion $b$. The sleeve $a$ which is preferably of sheet metal, is split longitudinally so as to permit it to expand and is provided on its outer face with teeth or projections $a'$. The teeth are preferably formed by punching a sheet metal plate which is to form the sleeve preparatory to forming it into a sleeve, so that tubular open-ended projections are formed, as shown. The wooden body portion $b$ of the dowel preferably has one end notched as shown at $b'$ for a purpose hereinafter described.

In use sleeve $a$ is inserted in the registering holes of the wooden parts 1 and 2 to be united, with the outer end of the sleeve below the face of the part 1, as shown in Fig. 3, and then the wooden body portion $b$ which has been dipped in glue is driven into the sleeve $a$ as shown at the left of said Fig. 3. When the wooden dowel body $b$ is driven into the sleeve $a$, the projections or teeth $a$ of the sleeve are forced in the parts 1 and 2, to securely hold the sleeve in the said opening, and at the same time, the glue on the body portion will enter the teeth or projections, so that the said body portion is securely held in the sleeve. Some of the glue on the body $b$ will also enter the notch at the inner end of the body and assist in holding the said body in the sleeve. After the body has been driven into the sleeve $a$, a wedge $c$ is driven into the said body so as to spread the outer end thereof and completely fill the opening. By the employment of the wedge and placing the sleeve in the opening, so that its outer end is below the face of the parts 1 or 3, the said parts can be readily dressed or cleaned off. In connecting large pieces as shown in Fig. 3, the part 1 is preferably notched or recessed as shown to receive the part 2, but in securing small pieces 3 and 4, as shown in Fig. 4, this is unnecessary.

In Figs. 5, 6 and 7, I have shown a dowel B especially adapted for securing parts of hard wood or the parts of heavier work, such as doors or window frames. In this case the sleeve $d$ is formed with teeth $d'$ and in other respects is similar to that shown in the other views, except that it is of heavier metal, but the dowel body $e$ is of iron and formed of three members $f$, $g$, $h$. The members $f$ and $g$ are approximately semicircular and the part $h$ is slightly tapering. In this form of the dowel, the sleeve is inserted in the opening of the parts to be united and after the parts $f$ and $g$ of the body have been inserted in the sleeve, the part $h$ is driven in between the said parts $f$ and $g$.

By the employment of the improved dowel in place of the mortise and tenon, the weakening of the parts due to the mortise and tenon and the pegs which secure the tenon in the mortise, is avoided, and the parts can be joined at a perfect right angle with much less trouble and time.

I claim—

1. A dowel for securing two parts of a wooden structure together, comprising an expansible metal sleeve having teeth or projections on its periphery, and a dowel body in the sleeve and of a slightly greater diameter than the sleeve, whereby when the dowel is applied the sleeve will be expanded and its teeth or projections forced into the parts connected by said dowel.

2. A dowel for securing two parts of a wooden structure together, comprising an expansible sleeve provided with teeth or projections on its periphery, and a dowel body in said sleeve, said dowel body consisting of three sections.

In testimony that I claim the foregoing I have hereunto set my hand.

TEÓFILO TISSIER.

Witnesses:
 FEDERICO SCHUTZ LLAMOS,
 CELESTINO LAFAILLE.